United States Patent Office 3,483,297
Patented Dec. 9, 1969

3,483,297
TREATMENT OF DIABETES WITH BENZENE-SULFONYLCYCLOHEXYL UREAS
Helmut Weber, Frankfurt am Main, Walter Aumüller, Kelkheim, Taunus, and Rudi Weyer and Gerhard Korger, Frankfurt am Main, Germany, assignors to Farbwerke Hoechst Aktiengesellschaft vormals Meister Lucius & Brüning, Frankfurt am Main, Germany, a corporation of Germany
No Drawing. Continuation-in-part of applications Ser. No. 84,512, Jan. 24, 1961, and Ser. No. 306,599, Sept. 4, 1963. This application Jan. 4, 1966, Ser. No. 518,552
Claims priority, application Germany, Jan. 26, 1960, F 30,394; Sept. 14, 1962, F 37,807; Jan. 23, 1963, F 38,828
Int. Cl. A61k *27/00;* C07c *143/84, 127/22*
U.S. Cl. 424—321
6 Claims

ABSTRACT OF THE DISCLOSURE

This invention relates to compositions and methods for lowering of blood sugar in the treatment of diabetes using benzenesulfonylcyclohexyl ureas.

---

This application is a continuation-in-part of U.S. applications Ser. Nos. 84,512 of Jan. 24, 1961 and 306,599 of Sept. 4, 1963, both now abandoned.

The present invention provides benzenesulfonylcyclohexyl ureas of the formulae

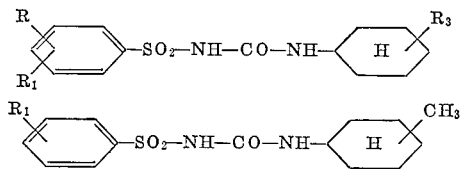

and

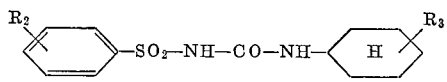

in which R is hydrogen, halogen, lower alkyl or lower alkoxy, $R_1$ is halogen, lower alkyl or lower alkoxy, $R_2$ is azido, trifluoromethyl or lower acyl and $R_3$ is alkyl having from 2 to 4 carbon atoms, and physiologically tolerable salts of these compounds.

The present invention likewise provides pharmaceutical preparations containing benzenesulfonylcyclohexyl ureas of the above-indicated formulae or the salts thereof in admixture or conjunction with the usual pharmaceutical adjuvants, carrier substances and/or stabilizers.

The above-mentioned benzenesulfonyl ureas are prepared by methods generally known.

It is possible, for example, to react correspondingly substituted benzenesulfonyl isocyanates with correspondingly substituted cyclohexyl amines; instead of these cyclohexyl amines there may also be used derivatives thereof, for example, acylated cyclohexyl amines, whereby the acyl radical is split off in the reaction products. It is also possible to prepare the desired benzenesulfonyl ureas by reacting correspondingly substituted cyclohexyl isocyanates with correspondingly substituted benzenesulfonic acid amides, preferably in the form of their salts. Instead of benzenesulfonyl isocyanates there may generally be used compounds which in the course of the reaction form such benzenesulfonyl isocyanates, for example, the reaction products of benzenesulfonyl isocyanates with acid amides, such as caprolactam, butyrolactam, etc. and with weakly basic amines, such as carbazoles, etc. Instead of substituted cyclohexyl isocyanates there can likewise be used such compounds as form these isocyanates in the course of the reaction. It is also possible to react correspondingly substituted benzenesulfonyl carbamic acid esters which in the ester component contain a low molecular alkyl radical or a phenyl radical, and/or benzenesulfonyl-monothio-carbamic acid esters with the above cyclohexyl amines, or to react correspondingly substituted carbamic acid esters which contain a low molecular alkyl radical or a phenyl radical, in the ester component and/or corresponding monothio-carbamic acid esters with the above benzenesulfonamides.

The desired compounds can also be obtained from correspondingly substituted benzenesulfonyl carbamic acid halides and the above cyclohexyl amines or conversely from substituted cyclohexyl-carbamic acid halides and the above benzenesulfonamides. Furthermore, benzenesulfonyl ureas which are unsubstituted or mono- or di-substituted by other alkyl or aryl radicals at the terminal nitrogen atom can also be converted into the desired compounds when reacted with the above cyclohexyl amines or with salts of these amines. Instead of such substituted benzenesulfonyl, there may also be used the corresponding N-benzenesulfonyl-N'-acyl ureas or bis-(benzenesulfonyl)-ureas. Thus it is possible to treat these bis-(benzenesulfonyl)-ureas or N-benzenesulfonyl-N'-acyl-ureas with the above cyclohexyl amines and to heat the salts so obtained at temperatures above 100° C. It is, furthermore, possible to use as starting materials ureas, correspondingly substituted, or correspondingly substituted acyl-ureas in which the acyl group is a preferably low molecular aliphatic or aromatic acid radical or the nitro group; or correspondingly substituted diphenyl ureas in which the phenyl radicals may be substituted or may be connected directly or over an alkylene or hetero-atom bridge; or dicyclohexyl ureas of the formulae

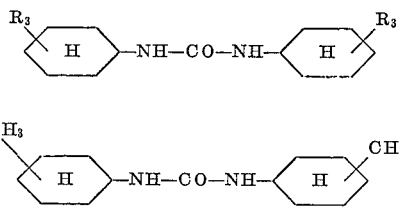

or

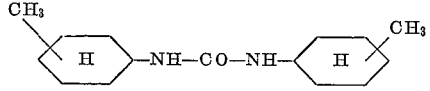

and to react these compounds with the above benzenesulfonamides. It is, furthermore, possible to react isourea ethers or the corresponding isothiourea ethers, guanidines or salts of correspondingly-substituted parabanic acids with tertiary amines, with substituted benzenesulfonyl halides and to convert the benzenesulfonyl isourea ethers benzenesulfonyl isothiourea ethers, benzenesulfonyl guanidines or benzenesulfonyl parabanic acids thus obtained by hydrolysis into the desired benzenesulfonyl ureas. It is also possible to prepare the correspondingly substituted benzenesulfonyl thioureas and to exchange the sulfur for oxygen in usual manner, for example by means of oxides or heavy metal salts, or by means of oxidizing agents, for example hydrogen peroxide, sodium peroxide or nitrous acid. The desired products are finally obtained by preparing correspondingly substituted benzenesulfonyl ureas and by oxidizing these compounds in known manner to yield the desired benzenesulfonyl ureas.

The processes may be varied to a large extent as concerns the reaction conditions and may be adapted to the conditions of each individual case. The reaction may be carried out, for instance, while using solvents, at room temperature or at an elevated temperature.

As starting substances there are used on the one hand compounds containing a benzene radical substituted by R, $R_1$ or $R_2$. As radicals R and $R_1$ there may be mentioned: halogen, especially chlorine and bromine, and low molecular alkyl and alkoxy such as methyl, ethyl, n-propyl, isopropyl, n-butyl, isobutyl, sec. butyl or tert. butyl, and methoxy, ethoxy, n-propoxy, isopropoxy or butoxy. $R_2$ stands for azido, trifluoromethyl or lower acyl, especially aliphatic acyl such as acetyl, propionyl, butyryl; or benzoyl. Particularly suitable are compounds in which R, $R_1$ and $R_2$ have the meaning of lower alkyl or lower alkoxy.

On the other hand compounds containing $R_3$-substituted cyclohexyl radicals are used as starting materials, $R_3$ being in 2,3- or 4-position and having the meaning of lower alkyl such as ethyl, n-propyl, isopropyl, n-butyl, isobutyl, sec. butyl, tert. butyl. $R_3$ as well as the group —$CH_3$ can be attached to the cyclohexyl radical in cis- or trans-position.

The sulfonyl urea derivatives obtained according to the process of the present invention are valuable medicaments which are characterized by a strong and particularly by long-lasting hypoglycemic action. Their blood sugar lowering effect can be determined, for instance, by giving to rabbits a dose of 400 milligrams/kilogram of the compounds of the invention and determining the blood sugar value for an extended period according to the method of Hagedorn/Jensen.

The values obtained with a number of compounds of the invention are compiled in the following Table 1:

TABLE 1

| No. | Compound | Blood sugar reduction in percent after application of 400 mg./kg. to rabbits, hours | | | | | | | |
|---|---|---|---|---|---|---|---|---|---|
| | | 1 | 2 | 3 | 4 | 5 | 6 | 24 | 48 |
| 1 | N-(4-methyl-benzenesulfonyl)-N'-(4-methylcyclohexyl) urea. | 5 | 25 | 33 | 35 | 45 | 34 | 8 | 0 |
| 2 | N-(4-methoxy-benzenesulfonyl)-N'-(4-methyl-cyclohexyl) urea. | 12 | 37 | 46 | 46 | ---- | 45 | 44 | 0 |
| 3 | N-(4-ethyl-benzenesulfonyl)-N'-(4-methyl-cyclohexyl) urea. | 15 | 35 | 21 | 24 | ---- | 30 | 30 | 0 |
| 4 | N-(4-methyl-benzenesulfonyl)-N'-(4-ethyl-cyclohexyl) urea. | 2 | 23 | 22 | 25 | 29 | 31 | 11 | 0 |
| 5 | N-(4-ethyl-benzenesulfonyl)-N'-(4-ethyl-cyclohexyl) urea. | 2 | 19 | 22 | 25 | 28 | 30 | 32 | 8 |
| 6 | N-(4-methyl-benzenesulfonyl)-N'-(4-isopropyl-cyclohexyl) urea. | 19 | 38 | 45 | 43 | 43 | 41 | 26 | 0 |
| 7 | N-(4-methoxy-benzenesulfonyl)-N'-(4-isopropyl-cyclohexyl) urea. | 18 | 29 | 50 | 43 | 42 | 40 | 40 | 0 |
| 8 | N-(4-isopropyl-benzenesulfonyl)-N'-(4-isopropyl-cyclohexyl) urea. | 3 | 14 | 12 | 13 | 21 | 28 | 35 | 25 |

It becomes clear from Table 1 that the compounds of the invention retain a blood sugar lowering activity after as much as 24 hours. Other known compounds closely related to the compounds claimed herein do not exhibit this property, as is shown in the following Table 2:

TABLE 2

| No. | Compound | Blood sugar reduction in percent after application of 400 mg./kg. to rabits, hours | | | | | | | |
|---|---|---|---|---|---|---|---|---|---|
| | | 1 | 2 | 3 | 4 | 5 | 6 | 24 | 48 |
| 9 | N-benzenesulfonyl-N'-cyclohexyl-urea. | 22 | 36 | 35 | ---- | 35 | 25 | 0 | 0 |
| 10 | N-(4-methyl-benzene-sulfonyl)-N'-cyclohexyl-urea. | 14 | 30 | 37 | ---- | 37 | 40 | 0 | 0 |
| 11 | N-(4-ethyl-benzenesulfonyl)-N'-cyclohexyl-urea. | 3 | 16 | 23 | 25 | 27 | 30 | 0 | 0 |
| 12 | N-(4-methoxy-benzenesulfonyl)-N'-cyclohexyl-urea. | 7 | 10 | 15 | 21 | ---- | 25 | 0 | 0 |
| 13 | N-(4-methyl-benzenesulfonyl)-N'-cyclohexyl methyl-urea. | 8 | 15 | 9 | 15 | 20 | 13 | 0 | 0 |

Compounds 9–13 are known from U.S. Patent No. 2,968,158 by Ruschig et al. The properties of the claimed compounds are even more remarkable when doses of 50 mg./kg. are applied to rabbits. This dose allows a more differentiated determination of the hypoglycemic activity and comes closer to the doses actually applied in therapy. Table 3 shows the results of these tests.

TABLE 3

| | Blood sugar reduction in percent after application of 50 mg./kg. to rabbits, hours after application | | |
|---|---|---|---|
| | 6 | 24 | 48 |
| Compound: | | | |
| 1 | 42 | 12 | 0 |
| 2 | 37 | 30 | 0 |
| 3 | 27 | 23 | 0 |
| 5 | 20 | 7 | 0 |
| 7 | 38 | 13 | 0 |
| 8 | 36 | 21 | 0 |
| 10 | 0 | 0 | 0 |
| 11 | 5 | 0 | 0 |
| 12 | 0 | 0 | 0 |

Thus the compounds representing the invention are still effective after 24 hours whereas the effectiveness of compounds 11–14 has gone back to zero after that time.

Since the compounds of the invention do not contain an amino group in para-position, the products of the invention do not show chemo-therapeutic action so that they do not cause injuries of the intestinal flore nor resistance of pathogenic germs when used in human medicine. In view of these properties they favourably differ from the known N-(4-amino-benzenesulfonyl)-N'-n-butyl urea likewise used as oral antidiabetic.

The products of the present invention are intended to be used preferably for the manufacture of preparations suitable for oral administration and lowering the blood sugar level in the treatment of diabetes mellitus. They may be administered as such or in the form of their physiologically tolerable salts or in the presence of substances which cause salt formation. For the formation of salts, there may be used, for example, alkaline agents, such as alkali metal hydroxides or alkaline earth metal hydroxides, alkali metal carbonates and alkaline earth metal carbonates, alkali metal bicarbonates and alkaline earth metal bicarbonates.

As pharmaceutical preparations there enter into consideration preferably tablets containing from 0.1 to 1 gram per dosage units of the products of the invention, and in addition thereto, the usual adjuvants and carriers such as talc, starch, lactose, tragacanth or magnesium stearate.

The following examples serve to illustrate the invention, but they are not intended to limit it thereto.

EXAMPLE 1

N-(4-methyl-benzenesulfonyl)-N'-(4-ethyl-cyclohexyl)-urea 12.7 grams of 4-ethyl-cyclohexylamine are dissolved in about 50 cc. of ether and, while cooling and shaking, dropwise mixed with 19.7 grams of p-toluene-sulfonylisocyanate which is diluted with some ether. The dropwise addition being terminated, the reaction mixture is allowed to stand for some time at room temperature, the crystallized product is filtered off with suction, reprecipitated from a large quantity of ammonia of 1% strength and recrystallized from ethanol/water. The N-(4-methyl-benzene-sulfonyl)-N'-(4-ethylcyclohexyl)-urea thus obtained melts at 181–183° C.

EXAMPLE 2

N-(4-methyl-benzenesulfonyl)-N'-(4-ethyl-cyclohexyl)-urea 23 grams of p-toluene-sulfonylurethane are heated with 12.7 grams of 4-ethylcyclohexylamine for one hour at 130° C. on the oil bath. A clear melt is formed from which methanol escapes. The melt is allowed to cool, and the reaction product is recrystallized from ethanol/water.

The so obtained N-(4-methyl-benzenesulfonyl)-N'-(4-ethyl-cyclohexyl)-urea melts at 181–183° C.

In an analogous manner there are obtained:

N-(4-chloro-benzenesulfonyl)-N'-(4-ethyl-cyclohexyl)-urea, melting point 158–160° C.,
N-(4-ethyl-benzenesulfonyl)-N'-(4-ethyl-cyclohexyl)-urea, melting point 170–172° C.,
N-(4-methoxy-benzenesulfonyl)-N'-(4-ethyl-cyclohexyl)-urea, melting point 191–193° C.,
N-(4-acetyl-benzenesulfonyl)-N'-(4-ethyl-cyclohexyl)-urea, melting point 199–201° C.,
N-(4-azido-benzenesulfonyl)-N'-(4-ethyl-cyclohexyl)-urea, melting point 164–165° C.,
N-(4-isopropyl-benzenesulfonyl)-N'-(4-ethyl-cyclohexyl)-urea, melting point 148–150° C.,
N-(4-methyl-benzenesulfonyl)-N'-(2-ethyl-cyclohexyl)-urea, melting point 160–162° C.,
N-(4-methyl-benzenesulfonyl)-N'-(4-isopropyl-cyclohexyl)-urea, melting point 185–186° C.,
N-(4-methoxy-benzenesulfonyl)-N'-(4-isopropyl-cyclohexyl)-urea, melting point 195–196° C.,
N-(4-acetyl-benzenesulfonyl)-N'-(4-isopropyl-cyclohexyl)-urea, melting point 205–207° C.,
N-(4-ethyl-benzenesulfonyl)-N'-(4-isopropyl-cyclohexyl)-urea, melting point 164–166° C.,
N-(4-azido-benzenesulfonyl)-N'-(4-isopropyl-cyclohexyl)-urea, melting point 163–165° C.,
N-(4-isopropyl-benzenesulfonyl)-N'-(4-isopropyl-cyclohexyl)-urea, melting point 173° C.,
N-(4-methoxy-benzenesulfonyl)-N'-(4-tert.-butyl-cyclohexyl)-urea, melting point 145–147° C.,
N-(4-ethoxy-benzenesulfonyl)-N'-(4-isopropyl-cyclohexyl)-urea, melting point 187–188° C.,
N-(4-methyl-benzenesulfonyl)-N'-(4-n-butyl-cyclohexyl)-urea, melting point 174–176° C.,
N-(3-methyl-benzenesulfonyl)-N'-(4-isopropyl-cyclohexyl)-urea, melting point 171–173° C.,
N-(2-methyl-benzenesulfonyl)-N'-(4-isopropyl-cyclohexyl)-urea, melting point 199–201° C.,
N-(4-chloro-benzenesulfonyl)-N'-(2-ethyl-cyclohexyl)-urea, melting point 162–164° C.,
N-(3,4-dimethoxy-benzenesulfonyl)-N'-(4-isopropyl-cyclohexyl)-urea, melting point 202–204° C.,
N-(3-chloro-4-methoxy-benzenesulfonyl)-N'-(4-isopropyl-cyclohexyl)-urea, melting point 210–211° C.,
N-(3-chloro-4-methoxy-benzenesulfonyl)-N'-(4-ethyl-cyclohexyl)-urea, melting point 178–180° C.,
N-(3,4-dimethyl-benzenesulfonyl)-N'-(4-isopropyl-cyclohexyl)-urea, melting point 193–195° C.,
N-(4-propionyl-benzenesulfonyl)-N'-(4-isopropyl-cyclohexyl)-urea, melting point 173–175° C.,
N-(4-propionyl-benzenesulfonyl)-N'-(4-ethyl-cyclohexyl)-urea, melting point 144–146° C.,
N-(3-methyl-4-methoxy-benzenesulfonyl)-N'-(2-ethyl-cyclohexyl)-urea, melting point 175–177° C.,
N-(3-methyl-4-methoxy-benzenesulfonyl)-N'-(4-isopropyl-cyclohexyl)-urea, melting point 202–204° C.,
N-(4-tert.butyl-benzenesulfonyl)-N'-(4-isopropyl-cyclohexyl)-urea, melting point 179–181° C.,
N-(3,4-dimethyl-benzenesulfonyl)-N'-(4-ethyl-cyclohexyl)-urea, melting point 188–189° C.,
N-(3,4-dimethyl-benzenesulfonyl)-N'-(4-sec.butyl-cyclohexyl)-urea, melting point 161–163° C., and
N'-(3,4-dimethoxy-benzenesulfonyl)-N'-(4-ethyl-cyclohexyl)-urea, melting point 203–204° C.

EXAMPLE 3

N-(4-methyl-benzenesulfonyl)-N'-(4-isopropyl-cyclohexyl)-urea 18.4 grams of 4-isopropyl-cyclohexyl-urea (melting point 142–145° C., prepared from 4-isopropyl-cyclohexyl-amino-hydrochloride and potassium cyanate in aqueous solution) are covered by pouring with 9.5 millilitres of di-methylsulfate and caused to react on the steam bath. The reaction mixture is allowed to cool, the reaction product is dissolved in about 50 millilitres of water, the solution of 19 grams of p-toluene-sulfochloride in 50 millilitres of acetone is added, and, while stirring, the solution of 9 grams of sodium hydroxide in about 50 millilitres of water is dropwise added thereto, whereby the solution is always kept weakly alkaline. The elevation of temperature above 40° C. is avoided by cooling. The dropwise addition being terminated, the reaction solution is stirred for a further hour, the crude isourea ether is then separated and heated with double the quantity of concentrated hydrochloric acid on the steam bath, until the evolution of gas is terminated. After cooling, the mixture is diluted with water, the N-(4-methyl-benzenesulfonyl)-N'-(4-isopropyl-cyclohexyl)-urea is filtered off with suction and recrystallized from ethanol. The substance obtained melts at 185–186° C.

EXAMPLE 4

N-(4-isopropyl-benzenesulfonyl)-N'-(4-isopropyl-cyclohexyl)-urea 20 grams of 4-isopropyl-benzenesulfonamide are dissolved in 200 millilitres of acetone and mixed with the solution of 4 grams of sodium hydroxide in 25 millilitres of water. 18 grams of 4-isopropyl-cyclohexyl-isocyanate (boiling point 89–90° C. under a pressure of 4.5 mm. of mercury, prepared from 4-isopropyl-cyclohexyl-amino-hydrochloride and phosgene) are dropwise added thereto at 5–10° C., while stirring, and stirring is continued for a further two hours. The reaction mixture is then filtered, the filtrate is mixed with water and acidified. The reaction product is filtered off with suction and recrystallized from ethanol/water. The N-(4-isopropyl-benzenesulfonyl)-N'-(4-isopropyl-cyclohexyl)-urea thus obtained melts at 173° C.

From 3-trifluoromethyl-benzenesulfonamide and 4-isopropyl-cyclo-hexyl-isocyanate there is obtained in an analogous manner the N-(3-trifluoromethyl-benzenesulfonyl)-N'-(4-isopropyl-cyclo-hexyl)-urea, melting point 182–183° C.

EXAMPLE 5

N-(4-isopropoxy-benzenesulfonyl)-N'-(4-isopropyl-cyclohexy)-urea 36.6 grams of 4-isopropoxy-benzenesulfonyl-urea are heated for 2 hours at the boil under reflux while cooling and while stirring in 300 milliliters of toluene with 9.9 grams of glacial acetic acid and 23.2 grams of 4-isopropyl-cyclohexylamine. The reaction mixture is allowed to cool, the precipitated product is filtered off with suction, the filtrate is concentrated under reduced pressure, and the residue is recrystallized from ethanol together with the suction-filtered material. The N-(4-isopropoxy-benzenesulfonyl) - N' - (4' - isopropyl - cyclohexyl) - urea melts at 193–195° C.

In an analogous manner there is obtained the N-(4-benzoyl - benzene - sulfonyl) - N' - (4 - isopropyl - cyclohexyl)-urea melting at 164–166° C. and the N-(4-benzoyl-benzenesulfonyl)-N'-(4-ethyl-cyclohexyl)-urea melting at 169–171° C.

EXAMPLE 6

N-(4-methyl-benzene-sulphonyl)-N'-(4-methyl-cyclohexyl)-urea 30 grams of toluene-sulfonyl-isocyanate are slowly added dropwise at 20° C. while stirring to 17 grams of 4-methyl-cyclohexylamine in 100 cc. of absolute benzene. The reaction mixture is stirred for 2 hours at room temperature, concentrated under reduced pressure and the residue is taken up in a large amount of ammonia solution of 1% strength in the heat. After treatment with animal charcoal the reaction solution is precipitated by means of hydrochloric acid. The N-4-(methyl-benzene-sulphonyl) - N' - (4' - methyl - cyclohexyl)-urea obtained melts 175–176° C. after having been recrystallized twice from alcohol. In an analogous manner there is obtained: N - (4 - methyl - benzenesulphonyl) - N' - (3' - methyl-cyclohexyl)-urea, melting point 174–175° C.

EXAMPLE 7

N-(3-methyl-benzene-sulphonyl)-N'-(4-methyl-cyclohexyl)-urea 34.5 grams of 3-methyl-benzenesulphonyl-methyl-urethane and 17 grams of 4-methyl-cyclohexylamine are heated for 2 hours to 125–130° C. The reaction product is treated with ammonia solution of 1% strength until no more substance is dissolved. After filtration with animal charcoal the ammoniacal solution is acidified with hydrochloric acid. The precipitating N-(3-methyl-benzenesulphonyl N'-(4'-methyl-cyclohexyl)-urea melts at 157–160° C. after having been recrystallized twice from alcohol. In an analogous manner there are obtained:

N-(4-methoxy-benzenesulfonyl)-N'-(4'-methyl-cyclohexyl)-urea, melting point 178–180° C.,
N-(4-chloro-benzenesulphonyl-N'-(4'-methyl-cyclohexyl)-urea, melting point 188–189° C.,
N-(4-bromobenzenesulphonyl)-N'-(4'-methyl-cyclohexyl)-urea, melting point 202–204° C.,
N-(4-methoxy-benzenesulphonyl)-N'-(3'-methyl-cyclohexyl)-urea, melting point 179–180° C.,
N-(4-methyl-benzenesulphonyl)-N'-(2'-methyl-cyclohexyl)-urea, melting point 166–168° C.,
N-(4-methoxy-benzenesulphonyl)-N'-(2-methylcyclohexyl)-urea, melting point 167–169° C.,
N-(4-ethyl-benzenesulphonyl)-N'-(4'-methyl-cyclohexyl)-urea, melting point 165–167° C., and
N-(4-tert.-butyl-benzenesulfonyl)-N'-(4'-methyl-cyclohexyl)-urea, melting point 209–211° C.

EXAMPLE 8

N-(4-chloro-benzenesulfonyl)-N'-(4'-methyl-cyclohexyl)-urea 10.7 grams of the sodium salt of 4-chloro-benzenesulfonic acid amide, 20 grams of N-(4-methyl-cyclohexyl)-N'-acetyl-urea (melting point 135–136° C., trans form) and 100 cc. of dimethyl formamide are heated for 16 hours to 100° C. on an oil bath. 1 liter of water is added to the yellow, clear solution and the latter is cleared with charcoal and filtered. On acidifying with 2 N-hydrochloric acid the trans form of the N-(4-chloro-benzenesulfonyl) - N' - (4' - methyl - cyclohexyl) - urea precipitates which after recrystallization from ethanol melts at 188–189° C.

We claim:

1. A composition suitable for oral administration and the lowering of blood sugar in the treatment of diabetes containing an effective amount of a compound of the formula

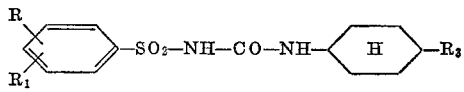

wherein R and $R_1$ each are hydrogen, halogen, lower alkyl or lower alkoxy, and $R_3$ represents alkyl having from 2 to 4 carbon atoms, or a pharmaceutically acceptable basic salt thereof, and a pharmaceutical diluent.

2. A tablet suitable for oral administration and the lowering of blood sugar in the treatment of diabetes containing from 0.1 to 1.0 gram of a compound of the formula

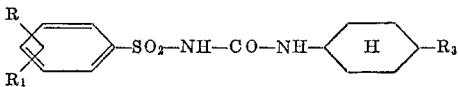

wherein R and $R_1$ each are hydrogen, halogen, lower alkyl or lower alkoxy, and $R_3$ represents alkyl having from 2 to 4 carbon atoms, or a pharmaceutically acceptable basic salt thereof, and a pharmaceutical diluent.

3. A process for the lowering of blood sugar in the treatment of diabetes which comprises orally administering to a human an effective amount of a composition having as the essential active ingredient a compound of the formula

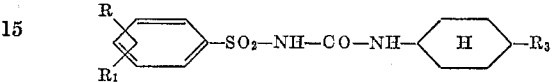

wherein R and $R_1$ each are hydrogen, halogen, lower alkyl or lower alkoxy, and $R_3$ represents alkyl having from 2 to 4 carbon atoms or a pharmaceutically acceptable basic salt thereof.

4. A tablet suitable for oral administration and the lowering of blood sugar in the treatment of diabetes containing 0.1 to 1.0 gram of a compound of the formula

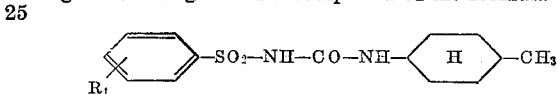

wherein R is hydrogen, halogen, lower alkyl or lower alkoxy, and a pharmaceutical diluent.

5. A composition suitable for oral administration and the lowering of blood sugar in the treatment of diabetes containing an effective amount of a compound of the formula

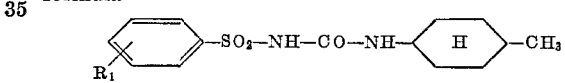

wherein R is hydrogen, halogen, lower alkyl or lower alkoxy, or a pharmaceutically acceptable basic salt thereof, and a pharmaceutical diluent.

6. A process for the lowering of blood sugar in the treatment of diabetes which comprises orally administering to a human an effective amount of a composition having as the essential active ingredient a compound of the formula

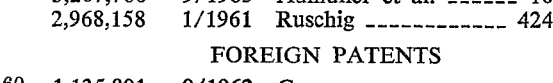

wherein R is hydrogen, halogen, lower alkyl or lower alkoxy, or a pharmaceutically acceptable basic salt thereof.

References Cited

UNITED STATES PATENTS

| | | | |
|---|---|---|---|
| 3,207,766 | 9/1965 | Aumuller et al. | 167—65 |
| 2,968,158 | 1/1961 | Ruschig | 424—321 |

FOREIGN PATENTS

| | | |
|---|---|---|
| 1,135,891 | 9/1962 | Germany. |

OTHER REFERENCES

Perrow et al., Journal of Medicinal and Pharmaceutical Chemistry, vol. 4, No. 1, July 1, 1961, pp. 41–49.

ALBERT T. MYERS, Primary Examiner

J. D. GOLDBERG, Assistant Examiner